(12) United States Patent
Veer et al.

(10) Patent No.: US 11,578,787 B2
(45) Date of Patent: Feb. 14, 2023

(54) EASY ADJUST TENSIONER ASSEMBLY

(71) Applicant: AGCO Corporation, Duluth, GA (US)

(72) Inventors: Andrew Mark Veer, Whitewater, KS (US); William Ryan Haar, Valley Center, KS (US)

(73) Assignee: AGCO Corporation, Duluth, GA (US)

( * ) Notice: Subject to any disclaimer, the term of this patent is extended or adjusted under 35 U.S.C. 154(b) by 254 days.

(21) Appl. No.: 16/955,232

(22) PCT Filed: Oct. 11, 2018

(86) PCT No.: PCT/IB2018/057893
§ 371 (c)(1),
(2) Date: Jun. 18, 2020

(87) PCT Pub. No.: WO2019/123032
PCT Pub. Date: Jun. 27, 2019

(65) Prior Publication Data
US 2020/0325967 A1 Oct. 15, 2020

Related U.S. Application Data

(60) Provisional application No. 62/612,776, filed on Jan. 2, 2018.

(30) Foreign Application Priority Data

Dec. 22, 2017 (GB) ...................................... 1721786

(51) Int. Cl.
*F16H 7/12* (2006.01)
*A01D 69/00* (2006.01)
(Continued)

(52) U.S. Cl.
CPC ........... *F16H 7/1281* (2013.01); *A01D 69/00* (2013.01); *A01D 41/1243* (2013.01); *A01F 29/14* (2013.01);
(Continued)

(58) Field of Classification Search
CPC ..... F16H 2007/0806; F16H 2007/0893; F16H 7/1281; F16H 2007/088
(Continued)

(56) References Cited

U.S. PATENT DOCUMENTS 1,792,165 A * 2/1931 Hollinger ................. A01C 3/06
474/121
1,835,617 A * 12/1931 Stewart ................. F16H 7/1281
474/135

(Continued)

FOREIGN PATENT DOCUMENTS

| EP | 1 440 766 A1 | 7/2004 |
|---|---|---|
| EP | 3 135 956 A1 | 3/2017 |
| WO | 2012/084825 A1 | 6/2012 |

OTHER PUBLICATIONS

UK Intellectual Property Office, Search Report for related UK Application No. GB1721788.6, dated Jun. 25, 2018.
(Continued)

*Primary Examiner* — Henry Y Liu

(57) ABSTRACT

A tensioning bar assembly for a tensioning assembly of a drive system of an agricultural machine includes a longitudinal bar having a top end, a bottom end, and a threaded portion. An attachment device is coupled to the top end to attach to a tensioning arm. A compression spring is located around a portion of the longitudinal bar. A first spring retainer engages with and retains a first end of the spring. A first locking nut fits to the threaded portion of the bar and retains the first spring retainer longitudinally in place relative to the bar. The longitudinal bar is rotationally freely coupled to the attachment device to permit free axial rotation of the bar about its longitudinal axis relative to the attachment device, and an engagement head is attached to and
(Continued)

located at or proximate the bottom end of the longitudinal bar for engagement with a tool.

9 Claims, 4 Drawing Sheets

(51) Int. Cl.
*A01D 41/12* (2006.01)
*A01F 29/14* (2006.01)
*F16H 7/08* (2006.01)

(52) U.S. Cl.
CPC ............... *F16H 2007/0806* (2013.01); *F16H 2007/088* (2013.01); *F16H 2007/0893* (2013.01)

(58) Field of Classification Search
USPC .................. 474/101, 133, 135, 138
See application file for complete search history.

(56) References Cited

U.S. PATENT DOCUMENTS

| | | | | |
|---|---|---|---|---|
| 2,195,229 A * | 3/1940 | Smart | .................. | F16H 7/02 474/119 |
| 2,341,273 A * | 2/1944 | Helberg | .................. | B64C 13/30 474/138 |
| 2,523,166 A * | 9/1950 | Tom | .................. | A01D 34/08 56/17.6 |
| 3,479,894 A * | 11/1969 | Cofer | .................. | F16H 7/1281 474/135 |
| 4,036,070 A * | 7/1977 | Knight | .................. | F16H 7/0827 474/119 |
| 4,324,552 A * | 4/1982 | Boushek, Jr. | .......... | A01D 69/08 474/135 |
| 5,769,747 A * | 6/1998 | Kuhn | .................. | A01D 34/6806 474/138 |
| 6,162,141 A * | 12/2000 | Rointru | .................. | F16H 7/1209 474/190 |
| 6,165,089 A * | 12/2000 | McGreal | .................. | F16H 7/1263 474/138 |
| 6,334,292 B1 * | 1/2002 | Walch | .................. | F16H 7/1281 56/11.6 |
| 6,796,419 B2 * | 9/2004 | Sousek | .................. | F16H 7/1209 198/813 |
| 7,677,018 B2 * | 3/2010 | Ducoulombier | ....... | A01D 43/10 56/11.6 |
| 9,939,052 B2 * | 4/2018 | Bailliu | .................. | F16H 9/04 |
| 10,054,199 B2 * | 8/2018 | Newman | .................. | F16H 7/1281 |
| 2004/0009834 A1 * | 1/2004 | Laufenberg | ............ | A01D 69/06 474/73 |
| 2012/0196710 A1 * | 8/2012 | Lehman | .................. | F16H 7/1263 474/117 |
| 2017/0059014 A1 * | 3/2017 | Bailliu | .................. | F16H 7/20 |

OTHER PUBLICATIONS

UK Intellectual Property Office, Search Report for related UK Application No. GB11721786.0, dated Jun. 25, 2018.
European Patent Office, International Search Report for related International Application No. PCT/IB2018/057893, dated Jan. 15, 2019.

* cited by examiner

EASY ADJUST TENSIONER ASSEMBLY

CROSS-REFERENCE TO RELATED APPLICATIONS

This application is a national phase entry under 35 U.S.C. § 371 of International Patent Application PCT/162018/057893, filed Oct. 11, 2018, designating the United States of America and published in English as International Patent Publication WO 2019/123032 A1 on Jun. 27, 2019, which claimed the benefit of the filing date of U.S. Provisional Patent Application 62/612,776, "Easy Adjust Tensioner Assembly," filed Jan. 2, 2018; and U.K. Patent Application 1721786.0, filed Dec. 22, 2017, "Easy Adjust Tensioner Assembly; the entire disclosure of each of which is incorporated herein by reference.

FIELD

The present invention relates to a tensioner bar apparatus. In particular, the invention relates to a tensioner bar apparatus for use with a tensioner arm for a drive belt. Such a drive belt may typically be found in an agricultural apparatus, such as a combine harvester or other agricultural machine.

BACKGROUND

Combine harvesters and other agricultural machines commonly contain a number of drive systems comprising a belt or chain to transfer power from a drive source to a driven power consuming system. Such belts or chains are often provided with a means for tensioning or taking up slack in the belt or chain in the drive system.

FIG. 1 shows a typical drive system 60 from a combine harvester. The drive system 60 provides drive power to a straw chopper at the rear end of a combine harvester.

The drive system 60 comprises a driving wheel 61 and a driven wheel 62 connected by a belt 63. Tension in the belt 63 is applied by an idler wheel 47, which presses against the belt 63 and is mounted on a tensioning arm 41.

The idler wheel 47 is rotationally mounted on a first end 41a of the tensioning arm 41, and the tensioning arm 41 is pivotally mounted, at a midpoint 41m, to the combine harvester. To the second end 41b of the tensioning arm is connected a tensioning bar assembly 11, which applies a tensioning force Fa.

The tensioning bar assembly 11 comprises a longitudinal bar 2. At a first, or 'top' end 2t of the bar 2 is a clevis assembly 3, which is connected to the second end 41b of the tensioning arm 41 by a clevis pin 36. In this prior art arrangement, the longitudinal bar 2 is rotationally fixed to the clevis assembly 3 such that in effect the bar 2 and clevis assembly 3 are a unitary item. A portion 2a of the bar 2 has a screw thread. Fitted over this threaded portion 2a of the bar 2 is a spring 4s, provided with a top retainer 4t and a bottom retainer 4b, which together keep the spring 4s in place.

When in position on the machine, the top retainer 4t butts up against a bracket 20 attached to the combine harvester. The bottom retainer 4b is kept in its position on the bar 2 by a pair of locking nuts 5a, 5b fitted onto the screw thread a first locking nut 5a for adjustment of spring compression and the second locking nut 5b for locking the first locking nut 5a in place.

When in position on the machine, the spring 4s is effectively compressed between the bracket 20 and the locking nuts 5a, 5b via the action of the top and bottom retainers 4t, 4b, respectively. The action of the spring 4s on the top retainer 4t, and thus the bracket 20, acts to 'push' the bottom retainer 4b, and thus the locking nuts 5a, 5b, away from the bracket 20. As the locking nuts 5a, 5b are threaded onto the longitudinal bar 2, this provides an axial force Fa along the bar 2 which in turn, through the clevis 3 and clevis pin 36, produces a sustained force on the second end 41b of the tensioning arm 41. As the tensioning arm 41 is pivotally mounted at a midpoint 41m, this produces a torque around the pivot point 41p, such that the idler wheel 47, mounted on the first end 41a of the tensioning arm 41, is pressed against the belt 63 and thus provides a tensioning force Ft on the belt 63.

It is occasionally necessary to adjust the tensioning bar assembly 11, either to change the spring tension or to replace worn or broken components. To do this, when the tensioning bar assembly 11 is in position, it is necessary first to loosen the second locking nut 5b. This releases the first locking nut 5a to be rotated around, and thus move along, the threaded portion 2a of the longitudinal bar 2, changing the axial position of the bottom retainer 4b and thus adjusting the spring compression (and hence the force with which the spring 4s acts against the bracket 20 and consequently, via the longitudinal bar 2, tensioning arm 41 and idler wheel 47, the tensioning force Ft with which the idler wheel 47 contacts the belt 63). This requires a wrench or spanner, such as an open end wrench/spanner or ratcheting wrench/spanner.

Use of such a wrench or spanner requires the involvement of an operator, and this is a job which is typically tedious and consumes an undesirable amount of time and energy. Further, machines such as a combine harvester, and indeed many other agricultural machines, are typically complex machines with many other components in close proximity to the drive system. Access to the locking nuts 5a, 5b, where an access route is typically required to be substantially perpendicular to the axis of the longitudinal bar 2 when a wrench is used, is therefore not always straightforward, further making the adjustment process problematic. Space is also required to allow for rotational movement of the wrench or spanner around the longitudinal bar 2 so as to rotate the nuts 5a, 5b on the threaded portion 2a. This is particularly challenging when the first part of the operation, namely loosening the second locking nut 5b, may require the use of two wrenches (spanners), due to tightness of the engagement of the locking nuts 5a, 5b one wrench to hold the first locking nut 5a stationary and provide a reactive torque against the torque applied by a second wrench being used to loosen the second locking nut 5b. Thus, access is typically required for two wrenches. A solution to these problems would be desirable.

BRIEF SUMMARY

In some embodiments, a tensioning bar assembly 111 for a tensioning assembly 101 of a drive system 60 of an agricultural machine includes a longitudinal bar 102 having a longitudinal axis 102x, a top end 102t and a bottom end 102b and a threaded portion 102a over at least a portion of the bar; an attachment device 103 coupled to the top end of the longitudinal bar for attaching the top end of the bar to a tensioning arm 41; a compression spring 4s having first 6b and second 6t ends and located around a portion of the longitudinal bar; a first spring retainer 4b for engaging with and retaining the first end 6b of the spring; a first locking nut 5a for fitting to the threaded portion 102a of the bar and for retaining the first spring retainer longitudinally in place relative to the bar. The longitudinal bar is rotationally freely coupled to the attachment device 103 to permit free axial rotation of the bar about the longitudinal axis 102x relative to the attachment device. An engagement head 102h, 302h is attached to and located at or proximate the bottom end 102b of the longitudinal bar 102. The engagement head is configured for engagement with a tool.

An advantage of this tensioning bar assembly is that the adjustment of the tensioning bar assembly may be performed by using a single wrench to hold the locking nut rotationally stationary relative to the longitudinal axis of the bar, and a second tool can then be used to engage with the engagement head attached to the bottom end of the bar. The bar itself can be rotated by the second tool, resulting in a rotational motion of the bar relative to the locking nut and hence altering the longitudinal placement of the locking nut on the threaded portion of the bar. Usefully, the engagement head may not require the use of an open end wrench and may be provided with a head for engagement with a complementary socket, or alternatively a socket for engagement with a complementary head, or similar mechanical arrangement, which complementary head or socket may also be attached to a power tool of some kind, such as a pneumatic socket gun or power screwdriver. This would make the adjustment of the tensioning assembly easier and also potentially a great deal quicker, as well as greatly reducing the physical exertion required by a user.

In an embodiment, the tensioning bar assembly further comprises a second spring retainer for engaging with and retaining the second end of the spring.

As will be described below, when in use the tensioning bar assembly will be fitted to a bracket and a tensioning arm. In some embodiments, the second end of the spring may directly contact the bracket, but in other embodiments the bar assembly is provided with a second spring retainer which is formed to 'cup' the end of the spring. This second spring retainer either butts up against or is connected to the bracket.

The first spring retainer is nominally kept in place longitudinally on the bar by the first locking nut. When the tensioner bar assembly is in place, the first spring retainer is pushed against the locking nut by the force of the spring.

In an embodiment, the first spring retainer and the first locking nut may be a unitary item, i.e., may be formed in one piece.

If the first spring retainer and first locking nut are a unitary item, then engagement of the spring with the first spring retainer may be more easily facilitated, because perpendicular motion of the first spring retainer will be prohibited due to its engagement with the threaded portion of the bar. It will also further facilitate the adjustment of the tensioner bar assembly.

In an embodiment, the bar assembly may be provided with a second locking nut, fitted adjacent to the first locking nut on the threaded portion of the bar, in order to 'lock' the first locking nut in place.

A second locking nut may be provided so as to assist in 'locking' the first locking nut, or, where there is a unitary first spring retainer/locking nut, the unitary item, axially in place on the threaded portion of the bar.

In some embodiments, the engagement head at or proximate the bottom end of the bar may be any one or more of: a triangle, square, pentagon or hex head or socket; a posi-drive head or socket; a torx head or socket; a slotted or phillips screwdriver receiving socket; a spline head or socket; a pair of locking nuts locked in position on the threaded portion, proximate the bottom end of the bar; or an engagement head device screwed to the bottom end of the bar on the threaded portion, optionally locked in place with a locking nut 5c.

The engagement head at or proximate the bottom end of the longitudinal bar has the purpose of allowing a tool to be applied to the longitudinal bar at a convenient point, and advantageously allows access to the engagement head in a longitudinal direction. Any shape of head may be used that allows for engagement with a tool. In some embodiments, a power tool may be used. The bottom end of the bar may therefore have any head or socket or other shape that allows engagement with a tool, and in addition to those already listed this may include any one of a head or socket such as Security Torx, Tri-wing, Spanner, Clutch, Mortorq, Frearson, Supadriv, Polydrive, Double square, Bristol, Torq-set, One-way, Pentalobe, TP3, or TTAP head, or indeed any other suitable geometry. The bar may be manufactured with such a head or socket in place as a unitary item with the bar. In a variant, the threaded portion of the bar may extend entirely to the bottom end of the bar, and a suitable head may be attached to the bottom end of the bar and locked in place with a locking nut. In a further variant, a hole may be present across a diameter of the bar, proximate to the bottom end, into which a pin may be inserted, and this pin may be engaged by a suitable tool.

In an embodiment, the top end 2t of the longitudinal bar 2 is located through a hole 34 in a portion 31 of the attachment device 3 and is retained in place by means of snap ring(s) or circlip(s) 21c, 22c located in groove(s) 21, 22 proximate the top end of the bar. In another embodiment, the attachment device is a clevis.

Axial rotation of the longitudinal bar relative to the clevis (or other attachment device), while the longitudinal bar is retained in the clevis may be achieved by provision of a hole, such as a circular hole, in a body of the clevis or device. The longitudinal bar generally has a round cross-section, and the top end of the bar may be inserted into and through the hole. This allows the axial rotation of the bar relative to the device/clevis. Longitudinal restriction of the bar relative to the body of the device may be achieved by a circular groove around the diameter of the bar at a point proximate the top end of the bar, into which a snap ring or circlip may be fitted. In a variant, two such circular grooves may be provided so that a snap ring or circlip may be fitted to the bar on either side of the portion of the bar which penetrates the device, thus preventing axial movement of the bar relative to the device in either longitudinal direction.

Alternatives to the clevis may be used as an attachment device, such as an L-shaped bracket with a hole in either arm, a rod, bar or plate with a hole for attaching to a pivot point and a piece of hollow tubing attached thereto for receiving the bar, or any one of a number of other equivalent items. However, in the art a clevis is generally used and for ease of reference herein a clevis may generally be referred to although any suitable alternative will be generally intended to be encompassed by such reference.

In an embodiment, a tensioning assembly 101 for a drive system includes a tensioning bar assembly 111 as described elsewhere herein, and further comprising a tensioning arm 41 pivotally mounted 41p to the machine; a tensioning device 47 mounted to the tensioning arm for contacting the drive system 60, 63 and applying a tensioning force Ft directly thereto; and a bracket 20 mounted to the machine. The attachment device 3 is attached to the tensioning arm 41 at an attachment point 41b, 41m, 3p and the second end of the spring 6t is in direct or indirect physical contact with the bracket 20. Compression of the spring applied by and between the bracket 20 and the first spring retainer 4b provides a resultant force Fa applied to the tensioning arm, via the attachment point 41b, 41m, 3p, about the pivot mounting point 41p of the tensioning arm, which produces the tensioning force Ft to force the tensioning device 47 into contact against the drive system 63.

The attachment point, where the clevis is attached to the tensioning arm, may usefully be a pivot mount where a clevis pin is inserted through holes in arms of the clevis and also through a hole in the tensioning arm. Clevis pins, threaded clevis pins, and alternatives therefor (such as a bolt-and-nut arrangement) are standard items well known to those skilled in the art, and any suitable pin or alternative may be used. Compression of the spring may be achieved by placing the second end of the spring against the bracket, attaching the clevis to the clevis attachment point, and then adjusting the first locking nut (via the method enabled by the main aspect of the invention) so as to move the first locking nut, and hence the first spring retainer towards the bracket, thus resulting in a compression of the spring. The spring thus produces a force which acts substantially longitudinally along the axis of the bar, either to pull the clevis attachment point towards the bracket, or, depending on the arrangement of the spring relative to the bracket and the arrangement of the tensioning arm, to push the clevis attachment point away from the bracket. In some embodiments, the bracket is provided with a hole through which the bar of the bar assembly is fitted. In such embodiments, the second end of the spring is placed against a second spring retainer, which is in turn placed against or connected to the bracket. Possible variations are described further in the embodiments below.

In embodiments, the bracket has a facing side 20f facing towards the tensioning arm and a distal side 20d facing away from the tensioning arm; the spring 4s, first retainer 4b, and first locking nut 5a are located on the distal side; and the second end of the spring 6t is in direct or indirect physical contact with the distal side 20d of the bracket such that the resultant force Fa acts to pull the attachment point 103p towards the bracket.

In embodiments, the bracket has a facing side 20f facing towards the tensioning arm and a distal side 20d facing away from the tensioning arm; the spring 4s, first retainer 4b, and first locking nut 5a are located on the facing side; and the second end of the spring 6t is in direct or indirect physical contact with the facing side of the bracket such that the resultant force acts to push the attachment point 103p away from the bracket.

In embodiments, the tensioning arm 41 has a first end 41a and a second end 41b, the tensioning device 47 being mounted proximate to the first end 41a, the attachment point 103p being proximate to the second end 41b, and the pivotal mounting 41p of the tensioning arm being at a midpoint 41m between the first and second ends.

In embodiments, the tensioning arm 241, 341 has a first end 41a and a second end 241b, 341b, the tensioning device 47 being mounted proximate to the first end 41a, the pivotal mounting 241p, 341p of the tensioning arm being proximate to the second end 241b, 341b, and the attachment point 103p being at a midpoint 241m, 341m between the first and second ends.

The second end of the spring may act directly against the bracket, or may act on a second spring retainer which in turn acts upon the bracket. The bracket may comprise a dish or annular groove which acts as a second spring retainer. The longitudinal bar may be positioned so that it passes through a hole or notch in the bracket, and/or may be positioned so that it passes through a hole or a notch in the second spring retainer. The second spring retainer may comprise a hole or notch through which the longitudinal bar passes, and may be attached by an arm so that the spring is laterally displaced from the bracket, as in FIG. 4c. The attachment may be by screws, rivets, a simple clamp, or by any other means generally known in the art, such as nut/bolt combination 27 shown in FIG. 4c.

The tensioning device may be any suitable device for pressing against the drive system of the machine.

The drive system may be a belt drive or may be a chain drive. In either case, the tensioning device may be an idler wheel, roller, or may be a simple bar. Where the drive system is a chain drive, the tensioning device may equally be an idler gear with teeth that engage the chain.

In some embodiments, there is provided a drive system comprising a tensioning arm assembly or tensioning assembly as described herein.

In some embodiments, there is provided an agricultural machine comprising a tensioning bar assembly, tensioning assembly or drive system as described herein.

In an embodiment, an agricultural machine may be a combine harvester.

BRIEF DESCRIPTION OF THE DRAWINGS

The invention will now be described in more detail by reference to the attached Figures.

FIG. 3 shows a diagrammatic view of elements of a tensioning bar assembly.

FIG. 3b shows a diagrammatic partial view of an end of the bar assembly as shown in FIGS. 3 and 3a.

DETAILED DESCRIPTION

Figure 1:
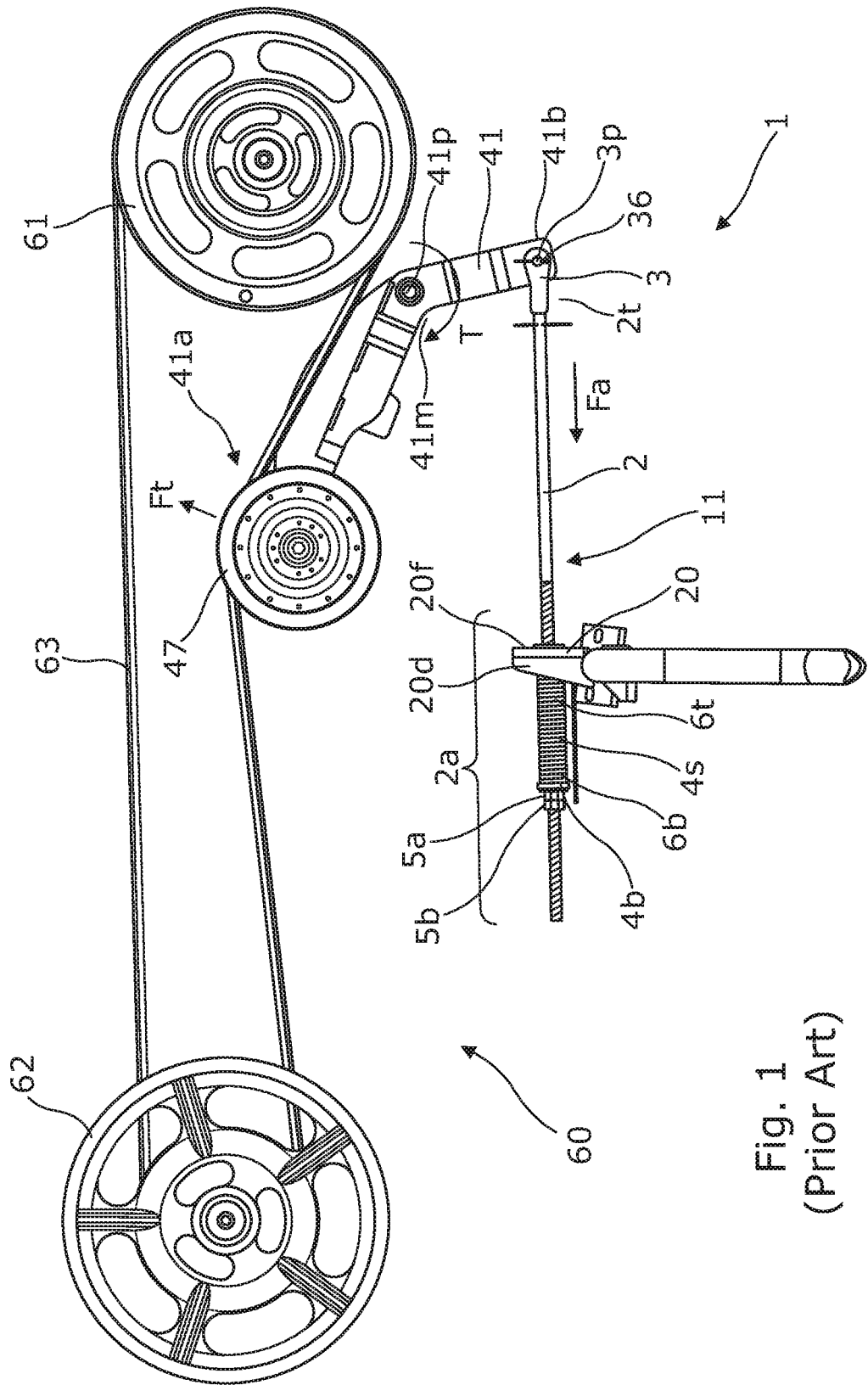
FIG. 1 shows a typical prior art drive system from a combine harvester. It shows a drive system which provides drive power to a straw chopper at the rear end of a combine harvester and which has a tensioning assembly comprising a tensioning arm and a tensioning bar assembly.
Figure 2:
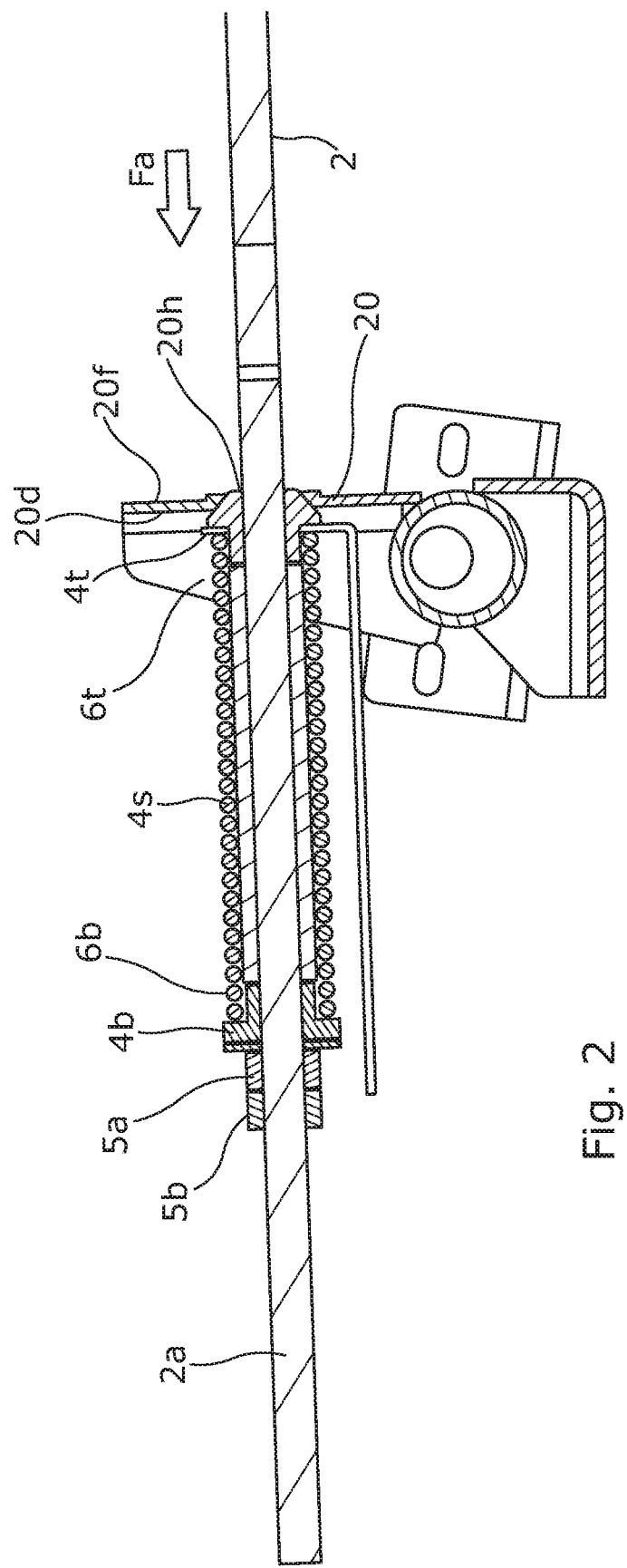
FIG. 2 shows a cross-sectional view through a portion of the prior art tensioning assembly of FIG. 1 in more detail.

FIG. 1, as described elsewhere herein, and FIG. 2 show:

The drive system 60 comprises a driving wheel 61 and a driven wheel 62 connected by a belt 63. Tension in the belt 63 is applied by a tensioning assembly 1. Tensioning assembly 1 includes an idler wheel 47 which presses against the belt 63 with force Ft and is rotationally mounted on a tensioning arm 41 at a first end 41a of the tensioning arm 41.

The tensioning arm 41 is pivotally mounted on a pivot 41p, at a midpoint 41m, to a combine harvester (not shown). To the second end 41b of the tensioning arm 41b is connected to a tensioning bar assembly 11, which applies a force Fa to the end 41b of the arm 41.

The tensioning bar assembly 11 comprises a longitudinal bar 2. At a first, or 'top' end 2t of the bar 2 is a clevis assembly 3 which is connected to the second end 41b of the tensioning arm 41 by a clevis pin 36 at an attachment point 3p. In this prior art arrangement, the longitudinal bar 2 is fixed to the clevis assembly 3 such that in effect the bar 2 and clevis 3 are a unitary item. A portion 2a of the bar 2 has a screw thread. Fitted over this threaded portion 2a of the bar 2 is a spring 4s, having first end 6b and second end 6t, and also a first spring retainer 4b and a second spring retainer 4t which together keep the spring 4s in place.

When in position on a combine harvester (or other machine), the second spring retainer 4t butts up against bracket 20 which is attached, ultimately, to the combine harvester. In FIG. 2, spring retainer 4t has a generally curved top surface which locates in a generally curved recess on the distal side 20d of bracket 20, which allows a degree of freedom of movement. Bar 2 fits through a hole provided in bracket 20. Bracket 20 has a facing side 20f facing towards the tensioning arm 41 and a distal face 20d facing away from the tensioning arm. The first spring retainer 4b is kept in its position on the bar by a pair of locking nuts 5a, 5b fitted onto the screw thread of bar portion 2a—a first locking nut 5a for adjustment of spring compression and the second locking nut 5b for locking the nuts in place.

When in position on the machine, the spring 4s is effectively compressed between the distal side 20d of bracket 20 and the locking nuts 5a, 5b via the action of the top and bottom (second and first) retainers 4t, 4b on ends of the spring 6t, 6b respectively. The action of the spring 4s on the second retainer 4t, and thus the bracket face 20d, acts to 'push' the first retainer 4b, and thus the locking nuts 5a, 5b, away from the bracket 20. As the locking nuts 5a, 5b are threaded onto and thus mechanically joined to the longitudinal bar 2, this provides an axial force Fa along the bar 2 which in turn, through the clevis 3 and clevis pin 36 at the attachment point 3p, produces a sustained pulling force on the second end 41b of the tensioning arm 41. As the tensioning arm 41 is pivotally mounted at a midpoint 41m of the arm 41, this produces a torque T around the pivot point 41p, such that the idler wheel 47, mounted on the first end 41a of the tensioning arm 41, is pressed against the belt 63 and thus provides a tensioning force Ft on the belt 63.

FIG. 3 shows a tensioning bar assembly 111 for use as a replacement for the prior art tensioning bar assembly 11 shown in FIGS. 1 and 2.

A longitudinal bar 102 has a first or top end 102t and a threaded portion 102a that extends from roughly a mid-point of the bar 102 to a second, or bottom end 102b of the bar 102. A portion of the bottom end 102b of the bar 102 is formed into a hex head 102h so that a tool can be applied to it. Spring 4s with ends 6b and 6t and first and second spring retainers 4b and 4t are fitted around the threaded portion 102a of the bar 102. First and second locking nuts 5a and 5b are also threaded on to portion 102a of the bar 102, adjacent the first spring retainer 4b. At the top end 102t of the bar 102 is affixed a clevis assembly 103, shown in more detail in FIG. 3a.

Figure 3A:
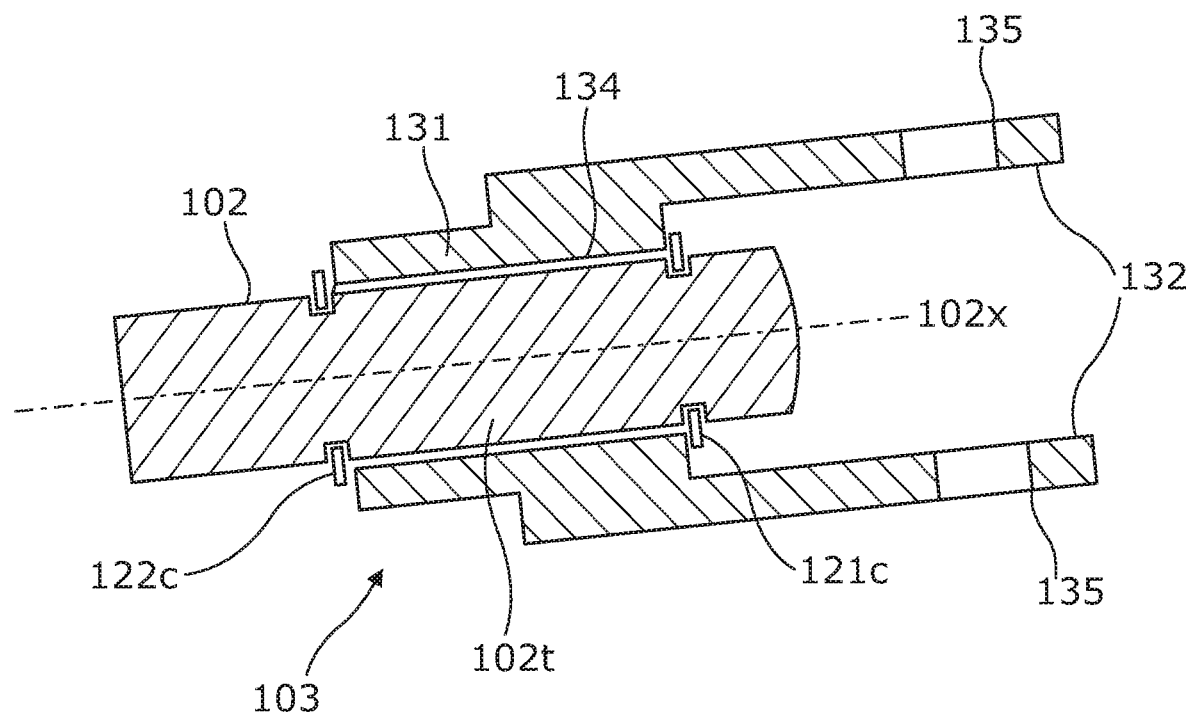
FIG. 3a shows a diagrammatic cross-sectional view of a clevis assembly.
Figure 3B:
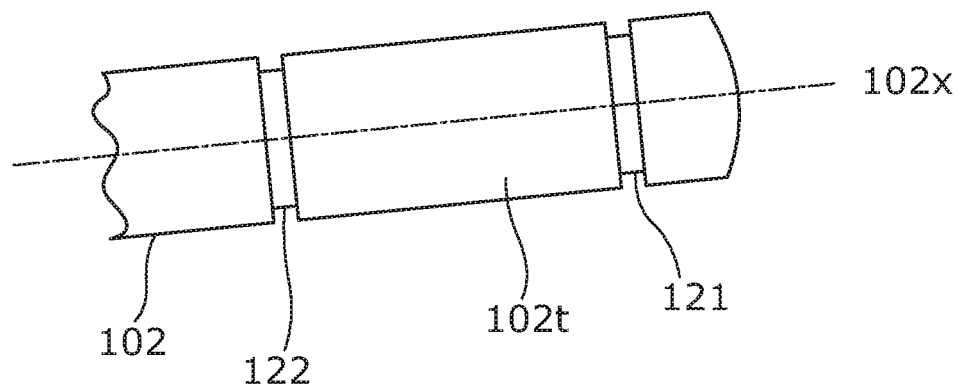

FIG. 3a shows that the clevis 103 has a main body 131 and arms 132. The main body 131 has a hole 134 through which top end 102t of bar 102 may slidingly fit. Hole 134 and bar 102 are circular in cross-section so that bar 102 may freely rotate within the hole 134 about longitudinal axis 102x. Each of the arms 132 is also provided with a hole 135 through which a clevis pin 36 may be fitted. In FIG. 3, it can be seen that clevis pin 36 is further fitted with a circlip 37. The top end of the bar 102t is provided with grooves 121 and 122, seen clearly in FIG. 3b, into which circlips 121c and 122c may be fitted as seen in FIGS. 3 and 3a. Depending on the fitment of the longitudinal bar assembly as part of the tensioning assembly, only one or other of the groove/circlip combinations may be required. For example, if the bar assembly is to provide a force Fa which pulls on the pivot point 3p, then only circlip 121c is strictly necessary. Likewise if the bar 102 is arranged to push on pivot point 3p, only circlip 122c may be required.

As described hereinbefore, the arrangement shown in FIGS. 3, 3a and 3b allows for the simple adjustment of the tensioning assembly by engaging a tool at locking nut 5a, which can then be held stationary while the bar 102 is rotated by application of another tool to the hex head 102h, thus rotationally moving bar 102 relative to nut 5a and hence moving nut 5a along the bar. Locking nut 5b can similarly be moved along the bar until it butts up against nut 5a, locking it in position. A final operation with wrenches on both nuts 5a and 5b may fully lock the nuts together.

Figure 4A:
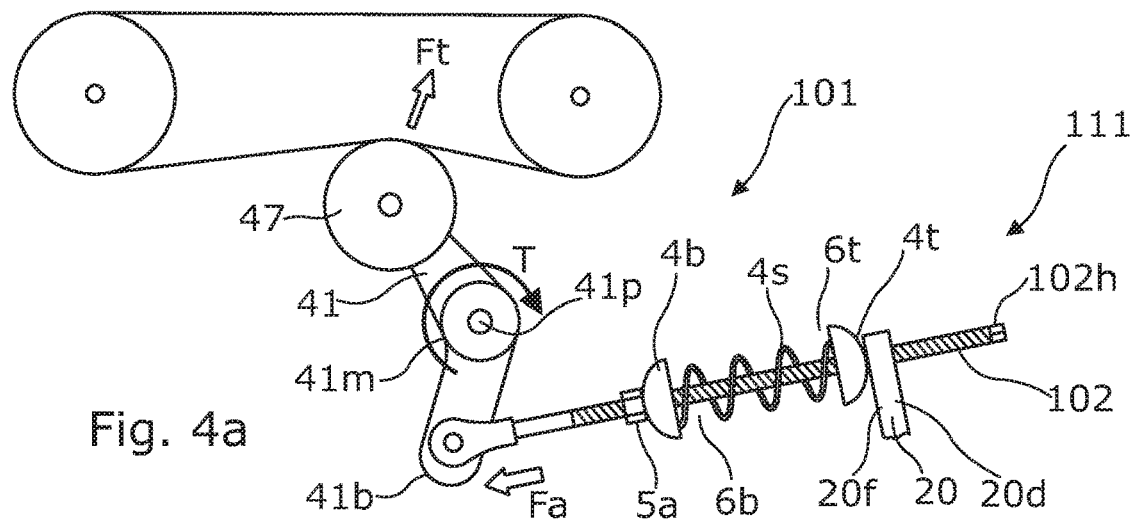
FIGS. 4a, 4b, and 4c show schematic alternative arrangements of bar assembly, bracket, and tensioner arm.

FIG. 4a shows an alternative embodiment of tensioning assembly 101 where a tensioning bar assembly 111 is arranged as part of a tensioning assembly 101 where the tensioning bar assembly 111 is located the other side of the tensioning arm 41 than in the arrangement of prior art FIG. 1. In this arrangement, tensioning force Fa is a pushing force on tensioning arm 41 due to the placement of the spring 4s, retainers (4b, 4t) and a locking nut 5a on the facing side 20f of the bracket 20. This results in the same torque T about pivot point 41p and tensioning force Ft as illustrated in FIG. 1, albeit with a different placement of elements of the tensioning assembly.

Figure 4B:
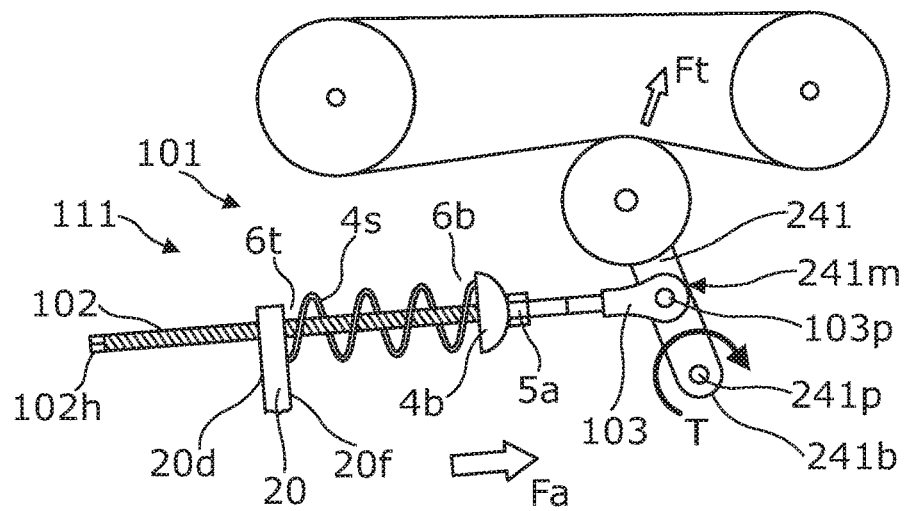

FIG. 4b shows an alternative embodiment where force Fa from tensioning bar assembly 111 is a pushing force on tensioning arm 241 due to the placement of the spring 4s, a retainer 4b and nut 5a on the facing side 20f of the bracket 20. In this embodiment, arm 241 is pivotally mounted 241p at its second end 241b and clevis 103 is mounted via pin 103p to a midpoint 241m of the arm 241. Pushing force Fa again results in a torque T about pivot point 241p which provides a tensioning force Ft on the belt 63. In this embodiment, it is also notable that second end 6t of spring 4s acts directly against the face 20f of the bracket 20 and there is no retainer 4t.

Figure 4C:
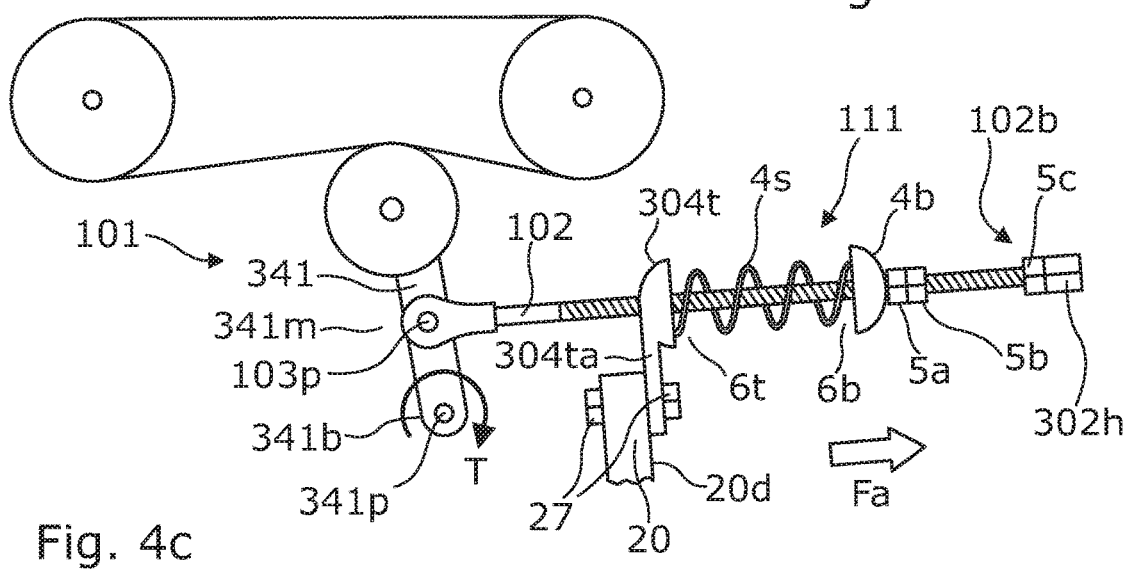

FIG. 4c shows an alternative embodiment where force Fa is a pulling force on tensioning arm 341 and tensioning arm 341 is pivoted about its second end 341b with clevis 103 attached to a midpoint 341m. In this embodiment, spring retainer 304t has an arm 304ta which is bolted by nut and bolt assembly 27 to bracket 20. In this way, the spring 4s acts indirectly against the distal face 20d of the bracket 20. Also in this embodiment is shown a head 302h which has been screwed on to the end 102b of bar 102, then locked in place with a locking nut 5c.

In summary there is disclosed a tensioning bar assembly 111 for a tensioning assembly 101 of a drive system 60 of an agricultural machine. A longitudinal bar 102 has a longitudinal axis 102x, a top end 102t, a bottom end 102b, and a threaded portion 102a over at least a portion of the bar. An attachment device 103 is coupled to the top end of the longitudinal bar for attaching the top end of the bar to a tensioning arm 41. A compression spring 4s has first 6b and second 6t ends, and is located around a portion 102a of the longitudinal bar 102. A first spring retainer 4b engages with and retains the first end 6b of the spring 4s. A first locking nut 5a fits to the threaded portion 102a of the bar 102 and retains the first spring retainer 4b longitudinally in place relative to the bar 102. The longitudinal bar 102 is rotationally freely coupled to the attachment device 103 to permit free axial rotation of the bar about the longitudinal axis 102x relative to the attachment device 103. An engagement head 102h, 302h is attached to and located at or proximate the bottom end 102b of the longitudinal bar 102 for engagement with a tool.

Clearly the skilled person will recognize that various aspects, embodiments and elements of the present application, including as illustrated in the figures, may be arranged in differing combinations, any and all of which may be considered to fall within the ambit of the inventive concept. The invention will be defined by the following claims.

The invention claimed is:

1. A tensioning bar assembly for a tensioning assembly of a drive system of an agricultural machine, the tensioning bar assembly comprising:
   a longitudinal bar having a longitudinal axis, a top end, a bottom end, and a threaded portion;
   an attachment device coupled to the top end of the longitudinal bar for attaching the top end of the bar to a tensioning arm, wherein the longitudinal bar is rotationally freely coupled to the attachment device to permit free axial rotation of the bar about the longitudinal axis relative to the attachment device;
   a compression spring having first and second ends, the spring located around a portion of the longitudinal bar;
   a first spring retainer engaging with and retaining the first end of the spring;
   a first locking nut fitted to the threaded portion of the bar and retaining the first spring retainer longitudinally in place relative to the bar; and
   an engagement head attached to and located at or proximate the bottom end of the longitudinal bar and fixed relative to the longitudinal bar, wherein the engagement head is configured for engagement with a tool;
   wherein the top end of the longitudinal bar is located within a hole in a portion of the attachment device and wherein the too end of the longitudinal bar is retained in place by a snap ring located in a groove proximate the top end of the bar.

2. The tensioning bar assembly of claim 1, further comprising a second spring retainer engaging with and retaining the second end of the spring.

3. The tensioning bar assembly of claim 1, wherein the first spring retainer and the first locking nut are a unitary item.

4. The tensioning bar assembly of claim 1, further comprising a second locking nut fitted adjacent to the first locking nut on the threaded portion of the bar, wherein the second locking nut is configured to lock the first locking nut in place.

5. The tensioning bar assembly of claim 1, wherein the engagement head comprises a head selected from the group consisting of a triangle head, a square head, a pentagon head, a hex head, a triangle socket, a square socket, a pentagon socket, a hex socket, a posidrive head, a posidrive socket, a torx head, a torx socket, a slotted-screwdriver-receiving socket, a Phillips-screwdriver-receiving socket, a spline head, a spline socket, a pair of locking nuts locked in position on the threaded portion of the bar proximate the bottom end of the bar; and an engagement head device screwed to the bottom end of the bar on the threaded portion of the bar.

6. The tensioning bar assembly of claim 1, wherein the attachment device is a clevis.

7. A drive system comprising the tensioning bar assembly of claim 1.

8. An agricultural machine comprising the tensioning bar assembly of claim 1.

9. The agricultural machine of claim 8, wherein the machine is a combine harvester.

* * * * *